United States Patent [19]

Shepherd

[11] 3,981,095

[45] Sept. 21, 1976

[54] SPORT-FISHING APPARATUS

[76] Inventor: Allen A. Shepherd, R.C.S. Manufacturing Company Rte. 1, Box 266A, West Columbia, S.C.

[22] Filed: May 13, 1975

[21] Appl. No.: 577,033

[52] U.S. Cl. .................................... 43/19.2; 43/24
[51] Int. Cl.². ......................................... A01K 87/00
[58] Field of Search ............................... 43/19.2, 24

[56] References Cited
UNITED STATES PATENTS

| | | | |
|---|---|---|---|
| 303,347 | 8/1884 | Wakeman | 43/19.2 X |
| 343,802 | 6/1886 | Everett | 43/24 |
| 1,122,466 | 12/1914 | Beyer | 43/19.2 |
| 1,401,096 | 12/1921 | Neudeck | 43/19.2 |
| 1,465,707 | 8/1923 | Bartholomew | 43/19.2 |
| 2,169,698 | 8/1939 | Lancaster | 43/19.2 |

*Primary Examiner*—Louis G. Mancene
*Assistant Examiner*—Daniel J. Leach
*Attorney, Agent, or Firm*—Kemon, Palmer & Estabrook

[57] ABSTRACT

A sport-fishing apparatus includes a hollow rod with a line extending through the rod interior. The line, while perfectly flexible to bending throughout its length, is relatively stiff in torsion so that rotation of one end is effective to rotate the opposite end. The rod handle houses a battery-powered motor, the shaft of which is concentrically arranged with respect to the handle, and secured directly to one end of the line. The line extends outwardly of the rod tip a distance substantially equal to the length of the rod and is arranged for free rotating movement within a resilient plastic sheath having one end secured within the rod and the other end terminating near the opposite end of the line.

5 Claims, 3 Drawing Figures

U.S. Patent   Sept. 21, 1976   3,981,095
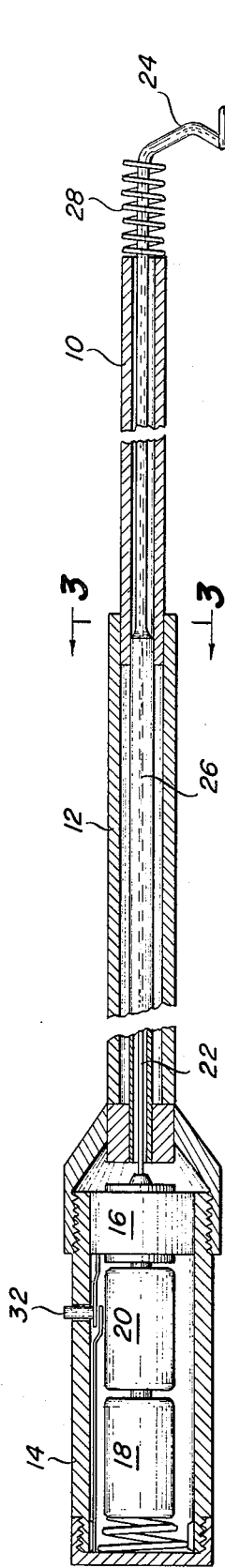
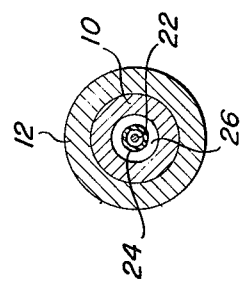
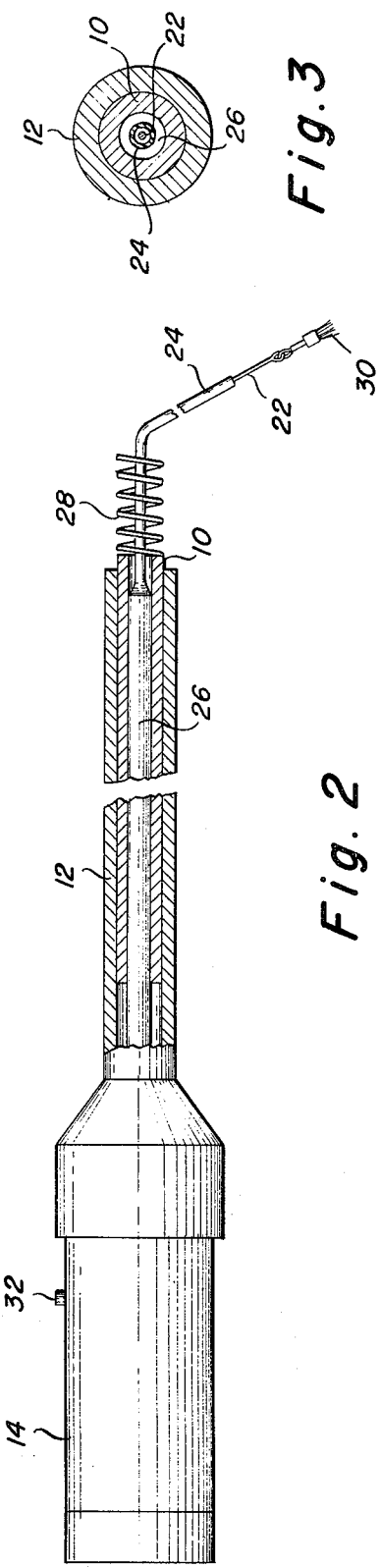

SPORT-FISHING APPARATUS

BACKGROUND OF THE INVENTION

Fishing apparatus employing various mechanical means for imparting motion to an artificial lure through movements of the line are known and examples may be found in the following prior U.S. patents:

| Wakeman | 303,347 | 1884 |
| Smith | 2,746,198 | 1956 |
| Mertz | 2,908,103 | 1959 |
| DeBerry | 3,465,464 | 1969 |

While the broad concept is not new, the prior art devices tend to be cumbersome and from a practical standpoint, have not enjoyed substantial commercial success. The principle object of the present invention is to provide a compact, easy to use fishing apparatus of the broad general type disclosed in the above patents, which is capable of extensive use without tiring the fisherman, and which is highly efficient for imparting fish attracting motion to any lure secured to the end of the line.

BRIEF SUMMARY OF THE INVENTION

A hollow rod, preferably telescopic, houses a battery-powered motor and batteries in its handle. The motor is disposed with its shaft concentric with the axis of the rod. The line, which is preferably cable, either plain or plastic coated, has one end secured directly to the shaft of the motor and it extends through the rod and out the tip a distance substantially equal to the length of the rod itself. The line is loosely received within a resilient plastic tube, one end of which is secured within the rod and the other end terminates a few inches from the end of the line. A coil spring attached to the tip of the rod and extending axially therefrom surrounds the line and tube and prevents kinking of either when the line is under tension at an acute angle to the rod.

BRIEF DESCRIPTION OF THE DRAWINGS

FIG. 1 is a side elevation partly in section showing a two piece telescopable rod in accordance with the present invention;

FIG. 2 is a view similar to that of FIG. 1, but showing the outer section of the rod telescoped within the inner section for carrying purposes; and FIG. 3 is a section on the lines 3—3 of FIG. 1.

DETAILED DESCRIPTION

Referring now to the drawing, the rod preferably of fiberglass, is shown as a two piece telescopic type, having tip and butt portions 10 and 12 respectively but obviously, any number of sections desired could be employed. The rod also includes a handle portion 14, which houses an electric motor 16 and batteries 18 and 20. The shaft of the motor is concentric with the longitudinal axis of the handle and one end of the line 22 is attached directly to the shaft of the motor. The line, of course, extends completely through the interior of the rod and out the opposite end, preferably a distance substantially equal to the length of the rod itself when in its extended position. The line 22 is loosely housed within a flexible resilient plastic tube 24, which at its inner end is secured to the outer end of a stiff tube 26, the inner end of which is secured to the innermost end of the section 12 of the rod. The purpose of the tube 26 is to prevent kinking or collapsing of the resilient sheath 24 when the rod section 10 is telescoped inwardly into the interior of the section 12. Secured to the outermost end of the rod section 10, is a helical coil spring 28, which surrounds the line 22 and tube 24. The purpose of the spring 28 is to insure a predetermined minimum radius in the line and tube 24 whenever the line is tensioned at an acute angle to the rod as for example, when playing a fish.

Any suitable lure, indicated at 30, may be attached to the terminal end of the line 22 by any suitable coupling means, all of which are well known to the art. A push button switch 32 mounted in the handle 14 permits energization of the motor 16 to effect rotation of the line 22. The line is preferably of the metallic multistrand twisted type and may or may not have a plastic coating on its exterior surface. Such a line will obviously be perfectly flexible to bending stresses but will be relatively stiff torsionally so that rotation of the inner end necessarily results in rotation of the opposite end.

In use, therefore, one has only to pull the pole out to its fully extended position, drop the lure into the water at any desired point, and then actuate the switch 32, either continuously or intermittently, or in any desired pattern in order to effect motion of the lure in the water.

While a preferred embodiment has been herein shown and disclosed, the applicant claims the benefit of a full range of equivalents within the scope of the appended claims.

I claim:
1. A sport-fishing apparatus, comprising:
    a. an elongated hollow rod having a handle at one end and a coil spring concentrically arranged at the opposite end and extending axially therefrom;
    b. a hollow control tube extending through said hollow rod having one end rigidly attached to the interior of said rod and the opposite end extending outwardly of the opposite end of said rod through said coil spring a distance substantially equal to the length of said rod;
    c. a line formed of substantially torsionally stable material extending completely through said control tube;
    d. a motor mounted within said handle with its shaft aligned with the longitudinal axis of said rod, one end of said line being rigidly attached to said shaft; and
    e. means on said handle for controlling the operation of said motor.
2. Apparatus as defined by claim 1, in which said rod is formed of at least two telescopable sections.
3. Apparatus as defined by claim 1, in which said motor is battery powered and the batteries are housed within said handle.
4. Apparatus as defined by claim 2, in which that portion of said hollow control tube within that section of said telescopable rod adjacent said handle is formed of stiff material compared to the balance of said tube which is resilient relative to said stiff portion.
5. Apparatus as defined by claim 1 in which said line is multiple strand twisted metallic cable.

* * * * *